United States Patent [19]

Manabe et al.

[11] Patent Number: 4,822,540

[45] Date of Patent: * Apr. 18, 1989

[54] PROCESS FOR THE PREPARATION OF A POROUS REGENERATED CELLULOSE HOLLOW FIBER

[75] Inventors: Seiichi Manabe, Ibaraki; Michitaka Iwata, Osaka; Mamoru Inoue, Nobeoka, all of Japan

[73] Assignee: Asahi Kasei Kogyo Kabushiki Kaisha, Tokyo, Japan

[*] Notice: The portion of the term of this patent subsequent to Apr. 8, 2003 has been disclaimed.

[21] Appl. No.: 867,228

[22] Filed: May 27, 1986

Related U.S. Application Data

[62] Division of Ser. No. 604,512, Apr. 27, 1984, Pat. No. 4,604,326.

[30] Foreign Application Priority Data

May 2, 1983 [JP] Japan ................................. 58-76305
May 2, 1983 [JP] Japan ................................. 58-76306

[51] Int. Cl.$^4$ ........................ D01F 2/04; D01D 5/247
[52] U.S. Cl. ..................................... 264/41; 264/561; 264/562; 264/199; 264/209.1; 264/211.11; 264/211.15; 264/211.16; 264/233; 210/500.23; 210/500.29
[58] Field of Search .................. 264/41, 49, 177.14, 264/187, 196, 199, 209.1, 211.11, 211.15, 211.16, 561, 562, 233; 210/500.23, 500.29; 428/398

[56] References Cited

U.S. PATENT DOCUMENTS

| 3,888,771 | 6/1975 | Iouge et al. | 210/500 |
| 4,219,517 | 8/1980 | Kesting | 264/49 |
| 4,388,256 | 6/1983 | Ishida et al. | 210/500.29 |
| 4,581,140 | 4/1986 | Manabe et al. | 210/500.29 |

FOREIGN PATENT DOCUMENTS 49-13424 2/1974 Japan.
55-1363 1/1980 Japan.

Primary Examiner—Jan H. Silbaugh
Assistant Examiner—Hubert C. Lorin
Attorney, Agent, or Firm—Finnegan, Henderson, Farabow, Garrett & Dunner

[57] ABSTRACT

A porous regenerated cellulose hollow fiber is obtained by a micro-phase-separation method. The hollow fiber is characterized in that the viscosity average molecular weight is at least $5 \times 10^4$, each of the average pore diameter $D_1$ on the inner wall surface of the hollow fiber and the average pore diameter $D_2$ on the outer wall surface is 0.02 to 10 μm, the in-plane porosity Pr on the outer wall surface is at least 10%, and the hollow fiber comprises a wall thickness portion having pores piercing therethrough between the inner wall surface and outer wall surface and a hollow portion extending continuously over the entire fiber length. The hollow fiber is prepared by a process characterized in that at the steps of extruding a cuprammonium solution of a cellulose from an annular spinning orifice and coagulating, regenerating and water-washing the extrudate, the spinning solution is extruded from an outer annular spinning orifice and a liquid having a coagulating action to the spinning solution is extruded from a central spinning orifice, and micro-phase-separation is caused to occur before the coagulation.

13 Claims, 2 Drawing Sheets

5μm

5μm

5μm

5μm

PROCESS FOR THE PREPARATION OF A POROUS REGENERATED CELLULOSE HOLLOW FIBER

This is a division of application Ser. No. 604,512, filed Apr. 27, 1984, now U.S. Pat. No. 4,604,326.

BACKGROUND OF THE INVENTION (1) Field of the Invention

This invention relates to a porous regenerated cellulose hollow fiber having a novel structure including pores, in which the average pore diameter on the inner and outer wall surfaces is 0.02 to 10 μm, and also to be process for the preparation thereof. More particularly, the present invention relates to a porous regenerated cellulose hollow fiber, which is characterized in that the viscosity average molecular weight of cellulose molecules forming a wall thickness portion is at least $5 \times 10^4$, each of the average pore diameters of the outer wall surface and inner wall surface of the hollow fiber is 0.02 to 10 μm, the in-plane porosity Pr of the outer wall surface is at least 10%, and the hollow fiber comprises a wall thickness portion having pores extending therethrough between the inner wall surface and the outer wall surface and a hollow portion extending continuously over the entire fiber length. The present invention also relates to a process for the preparation of a porous regenerated cellulose fiber having a screen filter structure and a hollow portion extending continuously through the entire fiber length, characterized in that at the steps of extruding a cuprammonium solution of a cellulose having an average viscosity of at least $5 \times 10^4$ from an annular spinning orifice and coagulating, regenerating and water-washing the extrudate, the spinning solution is extruded from an outer annular spinning orifice and a hollowing agent is extruded from a central spinning orifice, a liquid having a coagulating action to the spinning solution is used as the hollowing agent, and micro-phase-separation is caused to occur in the fibrous extrudate before coagulation. By the term "screen filter structure" used in the instant specification is meant a structure in which pores having a size of at least 0.02 μm are found on the entire surface of the wall thickness portion when the wall thickness portion is observed by an electron microscope. In case of this screen filter structure, it is confirmed by the electron microscope observation that pores are present in both the inner and outer surfaces of the wall thickness portion. A hollow fiber having such pores that can be observed by an electron microscope is called "a porous hollow fiber", and a hollow fiber in which the presence of such pores cannot be confirmed by an electron microscope is called "a non-porous hollow fiber".

(2) Description of the Prior Art

Of techniques of separating and purifying substances, the membrane separation technique has intensively been studied as means for separating ions, low-molecular-weight substances and substances having a size of the micron order such as suspended substances and fine particles in a liquid phase. One most difficult problem inhibiting practical application of this technique on a commercial scale is a low speed of separating substances. The substance-separating speed depends on the area of a membrane used. Accordingly, the membrane area should be increased with an increase of the amount of the substance to be treated, and in case of a plane membrane, the size of the apparatus is inevitably increased. This problem is solved by increasing the effective area of the separating membrane per unit volume and reducing the size of the apparatus by forming a plane membrane by very fine hollow fibers, performing separation of substances through fiber walls surrounding hollow portions as the separating membrane and constructing a substance-separating zone by bundling a plurality of hollow fibers. As the field where it is expected that the membrane separation system will be a main system in the future, there can be considered (1) the field where concentration, purification and recovery at low temperatures are necessary (such as fields of foodstuffs and biochemical industries), (2) the field where sterile and dust-free conditions are necessary (such as pharmaceutical and medical industries and electronics industries), (3) the field where concentration and recovery of minute amounts of expensive substances should be performed (such as atomic and heavy metal industries), (4) the field where minute amounts of special substances are separated (such as pharmaceutical and medical industries, and (5) the field where a large quantity of energy is consumed (such as substitute means for distillation). Hydrophilic membranes having a large pore size, which are capable of being handled very easily, are desired as membranes to be used in these fields.

A regenerated cellulose can be mentioned as a material having a high hydrophilic property. The solubility parameter $\delta_h$ depending on the hydrogen bond can be adopted as a value indicating the hydrophilic characteristic. The solubility parameters $\delta_h$ of a regenerated cellulose, a PVA copolymer, cellulose acetate, polymethyl methacrylate, polyacrylonitrile, polyethylene, polypropylene and Teflon are 11.9, 4.1 to 11.7, 6.6, 4.4, 3.7, 0.0, 0.0, and 0.0 (Cal/ml)$^{\frac{1}{2}}$, respectively. Among these polymers, the regenerated cellulose has the highest solubility parameter. The regenerated cellulose is insoluble in most of organic solvents and is excellent in the organic solvent resistance. Because of this high organic solvent resistance, a hollow fiber having a large average pore size has not been prepared from the regenerated cellulose. As another excellent property of the regenerated cellulose, there can be mentioned a high glass transition temperature (at least 150° C.) in the dry state or in an organic solvent. Furthermore, the regenerated cellulose is different from other synthetic polymers in the point where it has no toxicity to living bodies. Accordingly, development of a porous membrane of a regenerated cellulose having a large average pore size has been desired in the field of ultrafiltration using membranes.

As the hollow fiber composed of a cellulose as a typical instance of a hydrophilic polymer, there is known a hollow fiber for an artificial kidney (so-called non-porous hollow fiber in which the cross-sectional and longitudinal-sectional surfaces have fine pores having a size of up to 200 Å (0.02 μm) (see Japanese Unexamined Patent Publication No.49-134,920). Since this hollow fiber has a small pore size and a small average porosity Pr$p$ (8%), it can hardly be used for ultrafiltration or microfiltration.

Furthermore, a process for preparing a regenerated cellulose hollow fiber by saponifying a cellulose derivative such as cellulose acetate or cellulose nitrate with an aqueous solution of an alkali is known (see U.S. Pat. No. 4,219,517). In the hollow fiber obtained according to this process, the average pore diameter can be adjusted to 0.01 to 2 μm. However, since a cellulose derivative is used as the starting material, the average molecular weight of the cellulose molecules after regeneration is lower than $3.5 \times 10^4$ and the hydrophilic property is lower than that of a regenerated cellulose obtained according to the cuprammonium process. Accordingly, the mechanical properties (especially the strength) of this hollow fiber in the dry state are much lower than those of the conventional regenerated cellulose hollow fiber, and this hollow fiber is brittle. For example, the tensile elastic modulus of this hollow fiber is about $10^2 (100\text{-}Pr\rho)^3$ dyn/cm$^2$. The tensile strength at break is substantially in proportion to the elastic modulus and is about 1/10 of the elastic modulus. The strength in the state wetted with water is much lower than the strength in the dry state. Accordingly, the conventional regenerated cellulose hollow fiber obtained from a cellulose derivative is often broken during handling. Furthermore, in the above-mentioned process for the preparation of a regenerated cellulose hollow fiber which comprises regenerating a cellulose derivative, the preparation steps become complicated and the manufacturing cost is increased.

As typical instances of the non-porous regenerated cellulose hollow fiber prepared from a cuprammonium solution of a cellulose, there can be mentioned (1) a cuprammonium cellulose hollow fiber, which has a uniform wall thickness of several to 60 μm along the entire fiber length and entire circumference and a uniform cross-section of a true circle having an outer diameter of 10 to several hundred μm and also having as hollow portion which extends continuously over the oriented entire fiber length (see Japanese Examined Patent Publication No. 50-40,168), (2) a hollow artificial fiber composed of a cuprammonium regenerated cellulose which has a cross-sectional structure in which the portion close to the outer surface has a denser porous structure than the portion close to the inner surface and the intermediate portion (see Japanese Examined Patent Publication No. 55-1,363), and (3) a hollow fiber for the dialysis, which is composed of a cuprammonium regenerated cellulose and has skinless smooth inner and outer surfaces, said fiber having a substantially uniform, dense and porous structure in which by electron microscope observation of a cuprammonium regenerated cellulose tube having a hollow core in the wet state, it is confirmed that fine pores having a size of up to 200 Å are present entirely on the cross-sectional surface and longitudinal-sectional surface (see Japanese Unexamined Patent Publication No. 49-134,920). Each of these known hollow fibers is prepared by directly extruding a cuprammonium cellulose spinning solution into air or a non-coagulating fluid through an annular orifice of a spinneret, causing the extrudate to fall down by the action of gravity or to rise by utilizing buoyant force, guiding a liquid having no coagulating action to the spinning solution to the inner central portion of the extruded spinning solution and extruding the liquid into the spinning solution, sufficiently drawing the extrudate by falling owing to the action of gravity or rising owing to buoyant force, and dipping the extrudate into an aqueous dilute solution of sulfuric acid to effect coagulation and regeneration. All of the hollow fibers prepared according to this process have an average pore diameter smaller than 0.02 μm. Accordingly, these hollow fibers cannot be applied to production of pure water, concentration and purification of foods, purification of medicines, sterilization or removal of fine particles. Therefore. development of a hollow fiber having a large pore diameter has been eagerly desired.

SUMMARY OF THE INVENTION

It is primary object of the present invention to provide a porous regenerated cellulose hollow fiber in which the above-mentioned defects of conventional non-porous regenerated cellulose hollow fibers are overcome and which is excellent in the mechanical properties and the filtration capacity and can be prepared advantageously on an industrial scale.

Another object of the present invention is to provide a process for preparing the above-mentioned excellent porous regenerated cellulose hollow fiber from a cuprammonium solution of a cellulose.

In one aspect of the present invention, there is provided a porous regenerated cellulose hollow fiber, characterized in that the viscosity average molecular weight of cellulose molecules is at least $5 \times 10^4$, each of the average pore diameter of the inner wall surface of the hollow fiber and the average pore diameter of the outer wall surface of the hollow fiber is in the range of from 0.02 to 10 μm, the in-plane porosity (Pr) of the outer wall surface of the hollow fiber is at least 10%, and the hollow fiber comprises a wall thickness portion having pores piercing therethrough between the inner wall surface and outer wall surface and a hollow portion extending continuously over the entire fiber length.

In another aspect of the present invention, there is provided a process for the preparation of a porous regenerated cellulose hollow fiber, characterized in that at the steps of extruding a cuprammonium solution of cellulose from an annular spinning orifice and coagulating, regenerating and water-washing the extrudate, the spinning solution is extruded from an outer annular spinning orifice and a liquid having a coagulating action to the spinning solution is extruded as a hollowing agent from a central spinning orifice, and micro-phase-separation is caused to occur in the fibrous extrudate before coagulation.

DETAILED DESCRIPTION OF THE INVENTION

Figure 1:
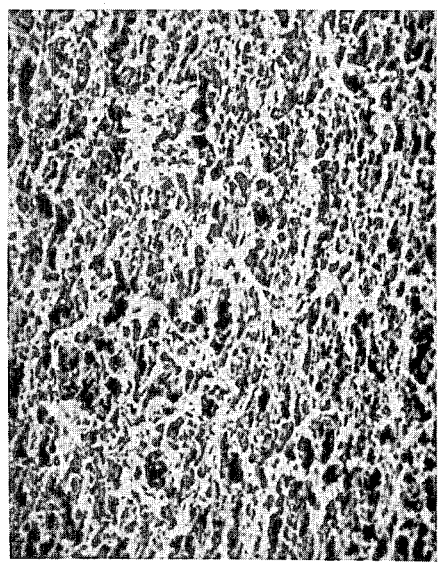
FIGS. 1, 2 and 3 are scanning type electron microscope photographs of the counter wall surface, intermediate part and inner wall surface, respectively, of a regenerated cellulose hollow fiber according to the present invention.

The first characteristic feature of the porous regenerated cellulose hollow fiber of the present invention is that the hollow fiber is composed of cellulose molecules having a viscosity average molecular weight of at least $5 \times 10^4$. Ordinarily, a regenerated cellulose hollow fiber is brittle in the dry state. Therefore, the conventional regenerated cellulose hollow fiber is generally wetted with glycerin or the like so as to prevent the hollow fiber from being dried. With an increase of the molecular weight, the strength of the porous hollow fiber is increased and the brittleness is moderated, and handling of the hollow fiber is facilitated and the breakage rate is decreased. The higher is the average molecular weight of cellulose molecules, the more reduced is the break ratio, if the comparison is made based on the same porosity. The influences of the average molecular weight on the physical properties of the membrane tend to be moderated as the average molecular weight of the molecular weight is increased. From the view point of the facility of practical handling, it is preferred that the average molecular weight be in the range of from $5.0 \times 10^4$ to $5.0 \times 10^5$, especially $5.5 \times 10^4$ to $3 \times 10^5$. This dependency on the molecular weight is not observed in a non-porous regenerated cellulose hollow fiber having an average pore diameter of not larger than 0.02 μm. Namely, the above-mentioned characteristic feature of the hollow fiber of the present invention means that the hollow fiber of the present invention has sufficient mechanical properties even in the dry state free of a wetting agent such as glycerin.

The most important characteristic feature of the porous hollow fiber of the present invention is that each of the average pore diameter $D_2$ of the outer wall surface of the hollow fiber and the average pore diameter $D_1$ of the inner wall surface of the hollow fiber is in the range of from 0.02 to 10 μm, the hollow fiber comprises a wall thickness portion having pores piercing therethrough between the inner wall surface and outer wall surface and the in-plane porosity Pr is at least 10%. It is preferred that the ratio ($D_1/D_2$) of $D_1$ to $D_2$ be in the following range: $0.5 \leq D_1/D_2 \leq 50$, the ratio ($D_3/D_2$) of the average pore diameter $D_3$ of the intermediate part of the wall thickness portion to $D_2$ is in the following range: $0.2 \leq D_3/D_2 \leq 10$, and the average porosity (Prρ) in the entire wall thickness portion is at least 40%. If these requirements are satisfied, the selective permeability and permeation speed can be increased.

The value $D_2$ of a known non-porous regenerated cellulose hollow fiber (for example, a non-porous regenerated cellulose hollow fiber disclosed in Japanese Unexamined Patent Publication No. 49-134920) is about 0.007 μm. In a non-porous hollow fiber regenerated by saponifying a hollow fiber of a cellulose derivative (for example, a hollow fiber disclosed in U.S. Pat. No. 4,219,517), the value $D_1$ or $D_2$ is smaller than 0.02 μm and the value Pr of the outer wall surface is smaller than 10%. The filtration speed in the porous hollow fiber of the present invention is which each of $D_1$ and $D_2$ is 0.02 to 10 μm and Pr of the outer wall surface is at least 10% is much higher than those of the known non-porous regenerated cellulose hollow fibers.

If $D_3$ is at least 0.2 μm and the ratio $D_3/D_2$ is in the range of $0.2 \leq D_3/D_2 \leq 10$, the ratio of the presence of piercing pores is increased, and from the dependency of the permeation coefficient on $D_3$, it is presumed that at least 30% of pores of the intermediate part of the wall thickness portion are piercing pores. In porous hollow fibers having the same values of $D_1$ and $D_2$, with increase of $D_3/D_2$, the filtration speed is increased. When separation is carried out by the parallel filtration method (wherein the filtration is carried out in the state where a fluid to be filtered flows through the hollow portion of the hollow fiber) or the vertical filtration method (wherein the filtration is carried out in the state where a fluid to be filtered is kept stationary), if the ratio $D_1/D_2$ is in the range of $0.5 \leq D_1/D_2 \leq 50$, a practically acceptable permeation capacity (a filtration speed of at least 2 l/hrμm²μmmHg) can be attained. Furthermore, if Prρ is at least 40%, the filtration speed is drastically increased and also the filtration volume is increased. Theoretically, the filtration speed is in proportion to Prρ and in inverse proportion to the thickness d of the wall thickness portion, and also the filtration volume is substantially in proportion to Prρ. If the requirement of $Pr\rho \leq d/2 (\bar{r}_3 \cdot \bar{r}_4)^{\frac{1}{2}}$ is satisfied, wherein Prρ stands for an average porosity in the entire wall thickness portion, d stands for the wall thickness (μm), $\bar{r}_3$ stands for a tertiary average pore radius (μm), and $\bar{r}_4$ stands for the quaternary average pore radius (μm), the filtration speed can be increased irrespectively of the value d. If Prρ is at least 40%, both the filtration speed and the filtration volume are increased with an increase of Prρ, and a larger value of Prρ is preferred if Prρ is at least 40% and a value Prρ of at least 50% is especially preferred. However, in view of the handling facility and mechanical properties of the hollow fiber, it is preferred that Prρ be less than 90%. In order to increase that filtration speed, a smaller value of d is preferred, but, in order to maintain a sufficient shaperetaining property in the hollow fiber, it is preferred that d be at least 5 μm, especially in the range of from 10 to 40 μm. In case of parallel filtration, the fluid to be filtered is travelled from the inner surface wall toward the outer surface wall in the hollow fiber. When the filtration speed is compared in various hollow fibers having the same values of $D_1$ and Prρ, it is seen that if $D_2$ is larger than $D_1$, both the filtration speed and the filtration volume are increased.

The ultrafiltration speed per pore is substantially in proportion to the fourth powers of the average pore diameters ($D_1$ and $D_2$) and also to Prρ. Accordingly, in order to increase the filtration speed alone, it is preferred that $D_1$ and $D_2$ are as large as possible. However, the maximum pore diameter should naturally be determined according to the size of particles to be separated. In the region where the characteristics of the hollow fiber as a hydrophilic microfilter type hollow fiber are sufficiently exerted, each of $D_1$ and $D_2$ is not more than 20 μm. If each of $D_1$ and $D_2$ is not more than 0.02 μm, the proportion of non-spherical particles in particles to be separated by the hollow fiber is increased. In case of the hollow fiber of the present invention, separation, removal and concentration of an intended component in a water-containing liquid or a gaseous mixture are performed, and the filtration is carried out at a high speed. If the average pore diameter is reduced, the filtration speed should naturally be drastically reduced. In the case where each of $D_1$ and $D_2$ is less than 0.02 μm, the proportion of non-piercing pores is increased, and the capacity of the hollow fiber as a filtering membrane is lower than the level estimated from the piercing pores. In order to avoid the co-presence of non-piercing pores, it is indispensable that both of $D_1$ and $D_2$ should be at least 0.02 μm.

Another preferred characteristic of the porous hollow fiber is that the crystal region consists of a crystal of cellulose II, cellulose III-2 or a mixture thereof and the orientation parameter of the plane (101) to the radial direction of the hollow fiber is not larger than 0.3. The fact that the crystal region consists of a crystal of cellulose II, cellulose III-2 or a mixture thereof means that the interior of the crystal region is substantially of cellulose molecules and hydroxyl groups of cellulose molecules are not substituted by other groups as in cellulose derivatives. The crystal of cellulose II or III-2 is chemically and thermally stable. Incidentally, a hollow fiber composed of a crystal of cellulose III-2 is obtained, for example, by dipping a hollow fiber composed of a crystal of cellulose II in liquid ammonia for 10 seconds and removing ammonia at 20° C., and the thermal stability of the hollow fiber is drastically increased.

Since the plane (101) is vertical to the direction of the intermolecular hydrogen bond, if the orientation parameter of said plane in the radial direction of the hollow fiber is smaller than 0.3, it can be construed that hydrogen bonds are arranged in random, and the hollow fiber is tough. For example, a hollow fiber in which the orientation parameter of said plane is not larger than 0.3, has a strength of at least $1.5 \times 10^7 (100 - Pr\rho)$ dyn/cm$^2$, and most of hollow fibers satisfying this requirement of the orientation parameter have a dynamic elastic modulus of at least $1.5 \times 10^8 (100 - Pr\rho)$ dyn/cm$^2$ as measured at 30° C. at a frequency of 110 Hz. This orientation characteristic has a significant influence on the deformation under wetting when the hollow fiber is dipped in water or an organic solvent. More specifically, if the orientation of the plane (101) is increased, the hollow fiber is swollen to a larger extent in the wall thickness direction than in the two other directions when the hollow fiber is swollen with water. On the other hand, the porous hollow fiber of the present invention is swollen substantially isotropically. Accordingly, when a substance is actually separated from an aqueous solution by using a membrane, increase of the membrane thickness due to wetting with water is small in the membrane of the present invention, and the apparent filtration speed is increased with reduction of the orientation parameter. Ordinarily, the orientation parameter of a conventional non-porous regenerated cellulose hollow fiber is larger than 0.4.

If the peak temperature Tmax in the curve showing the relation between the temperature and the dynamic loss tangent (tan$\delta$) as determined at a frequency of 110 Hz is at least 250° C., the thermal stability of the hollow fiber is increased and the heat resistance in an organic solvent is enhanced.

In the known process for preparing a non-porous hollow fiber from a cuprammonium solution of a cellulose, a liquid having no coagulating action to the spinning solution is used as the hollowing agent. Probably for this reason, the average pore diameter of the obtained hollow fiber is smaller than 0.02 $\mu$m. In contrast, if spinning is carried out according to the process of the present invention, porous hollow fibers having an average pore diameter within a broad range of from 0.02 to 10 $\mu$m can be obtained and the pore density per unit area is increased as compared with that of the hollow fiber prepared according to the known process. Furthermore, the number of piercing pores is increased. The most important characteristic feature of the process of the present invention is that a coagulating liquid causing micro-phase-separation is used as the hollowing agent. By the term "micro-phase-separation" used in the instant specification is meant the state where a concentrated or dilute phase of cellulose is stably dispersed in a solution in the form of particles having a diameter of 0.01 to several $\mu$m. Occurrence of micro-phase-separation is confirmed by loss of clarity in the fiber during spinning, which can be observed with the naked eye or by the presence of particles having a diameter of 0.02 to 1 $\mu$m in the yarn after spinning, which can be observed by an electron microscope.

The structural characteristic of the porous hollow fiber prepared according to the micro-phase-separation method is that it is confirmed by electron microscope observation that about $10^5$ to about $10^9$ of fine particles and agglomerates thereof are present per cm$^2$ of the membrane area. The pore diameter distribution of the porous hollow fiber prepared according to the micro-phase-separation method is sharp and the porosity is high. The filtration volume of the porous hollow fiber obtained according to the micro-phase-separation method is larger when the comparison is made based on the same average pore diameter and porosity. By the term "filtration volume" used in the instant specification is meant the volume of a fluid that can be filtered until the filtration speed per unit filtration area is reduced to a level corresponding to 60% of the initial value.

When a coagulating liquid is used as the hollowing agent, coagulation is advanced also from the inner wall surface portion, with the result that the average pore diameter of the inner wall surface portion can be increased. However, it is not true that the average pore diameter of the inner wall surface portion can always be increased if a coagulating liquid is used. It is indispensable that micro-phase-separation should be caused to occur before coagulation. By the term "coagulation" used in the instant specification, it is meant that a cuprammonium solution of a cellulose is solidified. In other words, it is meant that the viscosity of the solution becomes higher than $10^4$ poises. A hollowing agent suitable for causing microphase-separation differs according to the cellulose concentration, ammonia concentration and copper concentration in the cuprammonium solution of a cellulose, and therefore, a suitable hollowing agent should be determined in advance according to spinning solution. More specifically, a solvent having such properties that when this solvent is dropped with stirring into a spinning solution, that is, a cuprammonium solution of a cellulose, it causes micro-phase-separation without passage through coagulation if the amount of the dropped solvent is at least 10% by weight, preferably at least 20% by weight, based on the solution, is appropriately adopted. Ordinarily, a time of 10 seconds to scores of minutes is necessary for generation of micro-phase-separation. Accordingly, it is preferred to use a hollowing agent having a low molecular weight in the spinning operation, It also is preferred that the fibrous extrudate be dipped in a liquid (coagulant) having a coagulating action to the spinning solution. If a coagulant capable of causing micro-phase-separation is used, it is possible to form pores having an average pore diameter of at least 0.02 $\mu$m in the outer wall surface portion and the average porosity Pr$\rho$ can also be increased.

The pore structure of the inner wall surface portion is determined according to the composition of the hollowing agent and the pore structure of the outer wall surface portion is determined by the composition of the liquid falling in contact with the outer wall surface portion. The hollow fiber of the present invention can be prepared only by adopting an appropriate combinating of the hollowing agent and the above-mentioned liquid. In case of a plane membrane, a solid substance such as glass corresponds to the hollowing agent. Namely, a non-coagulating solid is used. Furthermore, in case of the hollow fiber, in order to retain the shape of the hollow fiber, the time required for causing occurrence of micro-phase-separation and then causing coagulation is extremely short and is shorter than about 1/10 of the time required in case of the plane membrane. Therefore, it is required for the combination of the above-mentioned liquid and hollowing agent that micro-phase-separation should be generated in a short time.

In the process of the present invention, since a cuprammonium solution of a cellulose in which the average molecular weight of cellulose molecules is at least $5 \times 10^4$ is used, a porous regenerated cellulose hollow fiber excellent in the mechanical properties (especially the strength) in the dry state can be prepared very easily. For example, a hollow fiber obtained according to the process of the present invention by using a cuprammonia solution of a cellulose having an average molecular weight of at least $1\times10^5$ has an elastic modulus of at least $1.5\times10^8$ $(100-Pr\rho)$ dyn/cm$^2$. A regenerated cellulose hollow fiber can be obtained by saponifying a hollow fiber of a cellulose derivative such as cellulose acetate or cellulose nitrate with an aqueous alkali solution. Some of hollow fibers prepared according to this process have an average pore diameter of 0.01 to 2 $\mu$m. However, since a cellulose derivative is used as the starting substance, the average molecular weight of cellulose molecules after regeneration is not higher than $4.0\times10^4$. Accordingly, the mechanical properties (for example, the strength) of the hollow fiber in the dry state are lower than those of a hollow fiber composed of a synthetic polymer. As the molecular weight is increased, the strength of the hollow fiber is increased and the brittleness is moderated, with the result that handling of the hollow fiber is facilitated and breakage of the hollow fiber is reduced. The higher is the average molecular weight of the cellulose, the lower is the breakage rate, if the comparison is made based on the same porosity. It is found that the influences of the average molecular weight on the physical properties of the hollow fiber tend to be moderated as the average molecular weight is increased. From the viewpoint of the practical handling facility, it is preferred that the average molecular weight be in the range of from $5.0\times10^4$ or $5.0\times10^5$, more preferably $5.5\times10^4$ to $3\times10^5$.

According to one preferred embodiment of the process of the present invention, a mixed solution comprising at least one organic solvent having no hydroxyl group and a solubility of at least 10% by weight in an aqueous solution of ammonia having a concentration of 28% by weight and not swelling a cellulose and having a composition causing micro-phase separation in a cuprammonium solution of a cellulose is used as the hollowing agent and the coagulant having direct contact with the outer wall surface portion of the fibrous extrudate. If a mixed solution comprising an organic solvent such as mentioned above is used as the hollowing agent and the coagulant, no skin layer (which is ordinarily formed in a conventional process) is formed and pores having a pore diameter of at least 0.02 $\mu$m are formed on both the outer wall surface and inner wall surface of the hollow fiber. This organic solvent-containing mixed solution comprises an organic solvent such as mentioned above, ammonia and water. If the concentration of ammonia is lower than 5% by weight, preferably lower than 3% by weight, based on water and the concentration of the organic solvent is 20 to 160% by weight, preferably 35 to 110% by weight, based on water, the pore diameter is increased, the number of pores per unit area of the hollow fiber (pore density) is increased and the proportion of piercing pores is increased, and the porous hollow fiber can be prepared stably with good reproducibility. By the term "organic solvent not swelling a cellulose" is meant an organic solvent having such properties that when the hollow fiber is dipped in the organic solvent at 20° C. for 10 minutes, the swelling ratio is in the range of from +5% to −3%.

If this organic solvent is added in advance to a cuprammonium solution of a cellulose at a concentration of lower than the concentration to the gel point or a concentration of not higher than 30% by weight, the spinning speed can be increased, the time required for the preparation can be shortened and the hollow fiber can be prepared with good reproducibility.

The characteristic principle of the process of the present invention is apparent from the fact that when a hollow fiber is prepared by spinning by using the above-mentioned mixed solution as the hollwing agent and coagulant, loss of clarity is caused in the hollow fiber during spinning. The most characteristic feature of the process of the present invention is that, after micro-phase-separation occurs, coagulation, regeneration and water washing are carried out. The microstructure of the hollow fiber which has passed through the stage of micro-phase separation is characterized in that in crystals of cellulose II and cellulose III-2, the degree of orientation of the plane (101) in the radial direction of the hollow fiber is lower than in the hollow fiber prepared according to the known process. Most of organic solvents causing this micro-phase separation have in common such properties that they have no hydroxyl group, the solubility in an aqueous solution of ammonia having a concentration of 28% by weight is at least 10% by weight and they do not swell a cellulose. When it is judged whether or not a certain organic solvent can be used in the process of the present invention, it is important to check whether or not the organic solvent has a hydroxyl group. When spinning is carried out by using a mixed solution comprising an organic solvent having a hydroxyl group, micro-phase-separation is not caused to occur and a transparent hollow fiber is formed or a skin layer is formed on each of the outer and inner wall surfaces of the hollow fiber, and in many cases, the pore diameter of the outer wall surface of the hollow fiber is not larger than 0.02 $\mu$m. As the organic solvent that can be used in the present invention, there can be mentioned ketones such as acetone and methyl ethyl ketone and amines such as trimethylamine. As the molecular weight of the organic solvent is low, the time required for generation of micro-phase-separation is shortened and the operation efficiency at the post treatment step is increased. Accordingly, use of an organic solvent having a low molecular weight is preferred. If the solubility of the organic solvent in an aqueous solution of ammonia having a concentration of 28% by weight [the amount (weight) of the solvent capable of being dissolved in 100 ml of an aqueous solution of ammonia having a concentration of 28% by weight] is lower than 10% by weight, micro-phase-separation is not caused to occur or caused to occur only to a negligible extent, and hence, thin skin layers are formed on the outer wall surface or inner wall surface of the hollow fiber at the spinning operation, and the average pore diameter of the obtained hollow fiber is smaller than 0.2 $\mu$m. The higher the solubility in water, especially an aqueous alkali solution, the better the obtained results.

The advantages of the process of the present invention can easily be attained if a cuorammonium solution of a cellulose having a cellulose concentration of 4 to 10% by weight is used as the spinning solution. If the cellulose concentration is lower than 4% by weight, the viscosity of the spinning solution is reduced and the fiber-forming property is degraded. Accordingly, the spinning state becomes unstable and it is difficult to obtain the hollow fiber with good reproducibility. If the cellulose concentration exceeds 10% by weight, the obtained hollow fiber is not rigid and becomes transparent, and both the porosity and the pore density are reduced. Accordingly, if the cellulose concentration is 4 to 10% by weight, a hollow fiber having properties suitable for microfiltratin or the like can be obtained.

The cuprammonium solution used in the present invention is a solution of a dense blue color composed mainly of copper and ammonia, which is called "Schweizer reagent", and a solvent system capable of substantially dissolving a cellulose therein is meant. A solvent system containing a cation in addition to copper or a solvent system in which a part of ammonia is replaced by other solvent may also be used. The cellulose concentration means a weight concentration of a cellulose in the cuprammonium solution. In the process of the present invention, the kind of the acid to be used for regeneration is not particularly critical, but from the viewpoint of the recovery operation or prevention of corrosion, it is preferred that dilute sulfuric acid (for example, dilute sulfuric acid having a concentration of 2% by weight) be used.

Typical instances of the characteristics of the microstructual features and the physical properties of the membrane prepared according to the process of the present invention will now be described.

The viscosity average molecular weight of cellulose molecules is $5.75 \times 10^4$, the dynamic elastic modulus is $1.3 \times 10^{10}$ dyn/cm$^2$ as measured at 30° C. at a frequency of 110 Hz, the peak value (tan$\delta$ max) of the dynamic loss tangent tan$\delta$ is 0.14, the peak temperature Tmax of tan$\delta$ is 262° C., the average pore diameter of the outer wall surface is 1 $\mu$m, the average pore diameter of the inner wall surface is 1.2 $\mu$m, and the average porosity is 72%.

The porous regenerated cellulose hollow fiber obtained according to the process of the present invention can be applied to separation and removal of an intended component from a water-containing liquid or a gas mixture or can be used as a hollow fiber for an artificial kidney, liver or pancreas of the filtration/dialysis type or the filtration type. Furthermore, the porous regenerated cellulose hollow fiber according to the present invention can be used as an ultrafiltration membrane, and the tough regenerated cellulose fiber of the present invention which is excellent in the hydrophilic characteristic and mechanical properties is advantageously used in the fields of industries relevant to living bodies (medical and biochemical industries) and food and fermentation industries.

Methods for determining physical properties referred to in the instant specification will now be described.

[Average Molecular Weight]

The average molecular weight Mv (viscosity average molecular weight) is calculated by substituting the limiting viscosity number ($\eta$) (ml/g) for the following formula (1):

$$Mv = [\eta] \times 3.2 \times 10^3 \quad (1)$$

[Fixation and Orientation Parameter of Crystals of Celluloses II and III-2]

An X-ray generating apparatus (RU-200 PL) and a goniometer (SG-9R), each being supplied by Rigaku Denkisha, are used. A scintillation counter is used as the counter tube and a pulse height analyzer (PHA) is used for the counter zone, and the symmetrical transmittance method using a Cu-K$\alpha$ ray (wavelength $\lambda = 1.5418$ Å) monochromatized by a nickel filter is adopted for the measurement.

Water contained in a hollow fiber having a length of 5 mm, which is wetted with water, is replaced by acetone, and the hollow fiber is air-dried. Then, 200 of so-dried hollow fibers are bundled in the form of cylinder having a diameter Dx (cm). The bundle is pressed under a load of about $100 \times Dx$ (Kg) to eliminate hollow portions. Namely, the bundle is seemingly deformed into a laminate membrane. The X-ray generating apparatus is operated under 40 KV $\times$ 100 mA. The X-ray diffraction intensity curves of the deformed hollow fiber in the cross-sectional equatorial and meridian directions are determined under the following conditions. The scanning speed is 1°/min, the chart speed is 10 mm/min, the time constant is 2 seconds, the diameter of the divergence slit is 2 mm, and the longitudinal width and lateral width of the receiving slit are 1.9 mm and 3.5 mm, respectively. The sample is attached so that the membrane thickness direction after deformation is in agreement with the equatorial direction.

The crystal of cellulose II is characterized by three diffractions of $2\theta = 12°$ [reflection from plane (101)], $2\theta = 20°$ [reflection from plane (10$\bar{1}$)] and $2\theta = 22°$ [reflection from plane (002)], and the crystal of cellulose III-2 is characterized by two diffractions of $2\theta =$ about 12° and $2\theta =$ about 21°.

In the X-ray diffraction intensity curves obtained with respect to the equatorial and meridian directions, the points of $2\theta = 5°$ and $2\theta = 35°$ are connected by a line, and this line is used as the base line. The distances (intensities) between the apexes of the diffraction peaks of the planes (101) and (10$\bar{1}$) and the base line are measured. The diffraction intensity of the plane (101) in the equatorial direction is designated as H$_1$, the diffraction intensity of the plane (10$\bar{1}$) in the equatorial direction is designated as H$_2$, the diffraction intensity of the plane (101) in the meridian direction is designated as H$_3$, and the diffraction intensity of the plane (10$\bar{1}$) in the meridian direction is designated as H$_4$. the diffraction intensity ratio A in the equatorial direction is expressed as H$_2$/H$_1$ and the diffraction intensity ratio B in the meridian direction is expressed as H$_4$/H$_3$. The orientation parameter OP is calculated according to the following formula (2):

$$\text{Orientation parameter OP} = 1 - (A/B) \quad (2)$$

[Average Pore Radius and Pore Density]

Supposing that the number of pores having a pore radius of from r to (r+dr) per cm$^2$ of the porous membrane is expressed as N(r)dr [N(r) represents the pore radius distribution coefficient], the i-degree average pore radius $\bar{r}_i$, the in-plane porosity Pr and the pore density N are given by the following formulae (3), (4) and (5), respectively:

$$\bar{r}_i = \frac{\int_0^\infty r^i N(r) dr}{\int_0^\infty r^{i-1} N(r) dr} \quad (3)$$

$$Pr\ (\%) = \pi \int_0^\infty r^2 N(r) dr \quad (4)$$

$$N = \int_0^\infty N(r) dr \quad (5)$$

Water contained in the interior of the hollow fiber in the wet state is substituted by acetone and the hollow fiber is then air-dried. Electron microscope photographs of the inner and outer wall surfaces of the obtained hollow fiber and the intermediate face of the wall thickness portion of the hollow fiber are taken by using a scanning type electron microscope. Sampling of the wall thickness portion is carried out according to the following procedures. Namely, the hollow fiber is embedded in a epoxy resin and a sample having a thickness of about 1 μm is cut out in parallel to the direction of the fiber axis of the hollow fiber at a position of 1/1.8 to 1/2.2 of the thickness as measured from the outer wall surface by using a glass knife attached to an ultramicrotome (Ultratome Model III-8800 supplied by LKB Co., Sweden). From these photographs, the pore radius distribution coefficient N(r) is calculated according to the known method and this coefficient is substituted for the formula (3). The portion of the scanning type electron microscope photograph, where determination of the pore radius distribution is desired, is enlarged to an appropriate size (for example, 20 cm×20 mc), and twenty test lines are equidistantly drawn on the obtained photograph. Each test line crosses many pores. The length of the portions of the line, which cross the pores present on the outer wall surface, the inner wall surface or the intermediate face of the hollow yarn, is measured, and the frequency distribution coefficient is determined. If it is difficult to determine whether or not the pores are present on the outer wall surface (or the inner wall surface or the intermediate face), all the pores observed on the photograph are regarded as pores present on the outer wall surface (or the inner wall surface or the intermediate face), and in this case, ⅓ of the value N calculated according to the formula (5) is defined as the pore density in the present invention. In this case, the double of Pr calculated by the formula (4) is defined as the in-plane porosity. The value of N(r) is determined by using this frequency distribution coefficient according to, for example, the method of sterheology (see, for example, "Quantitative Morphology" written by Norio Suwa and published by Iwanami Shoten). Incidentally, the average pore diameter is $2r_3$.

[Average Porosity Prρ]

Water contained in the interior of the hollow fiber in the wet state is substituted by acetone and the hollow fiber is then air-dried. Then, the hollow fiber is dried in vacuo so that the water content is lower than 0.5%. Supposing that the inner diameter of the dried hollow fiber is Di (cm), the outer diameter is Do (cm), the length of the hollow fiber is l (cm) and the weight is W (g), Prρ is given by the following formula (6):

$$Prρ(\%) = \left(1 - \frac{w}{0.375 \times \pi(D_0^2 - D_1^2) \times l}\right) \times 100 \quad (6)$$

[Tmax and Dynamic Elastic Modulus]

Water contained in the interior of the hollow fiber in the wet state is replaced by acetone and the hollow fiber is then air-dried. The dried hollow fiber having a length of 5 cm is set to Rheo-Vibron Model DDC-IIc supplied by Toyo Baldwin Co., the tanδ-temperature curve and the dynamic elastic modulus-temperature curve are determined at a frequency of 110 Hz and an average temperature elevating rate of 10° C./min in dry air, and the peak value (tanδ)max of tanδ, the position Tmax of the peak of tanδ and the dynamic elastic modulus at 30° C. are read from these curves.

EXAMPLES

The present invention will now be described in detail with reference to the following Examples.

EXAMPLE 1

Cellulose linter (having an average molecular weight of $2.3 \times 10^5$) was dissolved at a concentration of 6.5% by weight in a cuprammonium solution having an ammonia concentration of 6.8% by weight and a copper concentration of 3.1% by weight, which was prepared according to the known method. The solution was filtered and bubbles were removed to form a spinning solution. The spinning solution was directly extruded at a rate of 1.25 ml/min from an outer spinning orifice (2 mm in the outer diameter) of an annular spinneret into a mixed solution in which the ratio of acetone to water was 82.7% by weight and the ratio of ammonia to water was 1.0% by weight, and a mixed solution in which the ratio of acetone to water was 67.3% by weight and the ratio of ammonia to water was 0.9% by weight was directly extruded into the above-mentioned mixed solution at a rate of 1.77 ml/min from a central spinning orifice (0.4 mm in the diameter) of the annular spinneret. The extrudate was wound at a rate of 11 m/min. A transparent blue fibrous extrudate just after the extrusion was gradually whitened and micro-phase-separation was caused, and coagulation subsequently took place and the shape of a fiber was retained. Then, the extrudate was regenerated with an aqueous solution of sulfuric acid having a concentration of 2% by weight and was then washed with water. The obtained hollow fiber in the wet state had an outer diameter of 340 μm and an inner diameter of 300 μm. Water in the hollow fiber was replaced by acetone, and the hollow fiber was air-dried under tension, and the physical properties and microstructure were determined. The obtained results are shown in Table 1. A hypodermic needle connected to an injector was inserted into the hollow portion of the hollow fiber having a length of 10 cm, and the inserting portion (the connecting portion between the needle and the hollow fiber) and the other end of the hollow fiber were secured by an adhesive, and the filtration speed was measured. The obtained results are shown in Table 1. A small-size module was fabricated by using 100 of the thus-prepared hollow fibers having a length of 10 cm, and human blood (hematocrit value=38%, total protein content=7.2 g/dl, urea nitrogen content BUN=16 ng/dl and uric acid content=6.0 mg/dl) was introduced at a rate of 50 ml/min into the module from one end thereof. The blood pressure at the inlet was adjusted to 90 mmHg, and the total amount of the circulated blood was adjusted to 200 ml. The blood was filtered according to the parallel filtration method while the blood was circulated. The compositions of the blood and filtrate after 20 hours' filtration were as follows.

Figure 2:
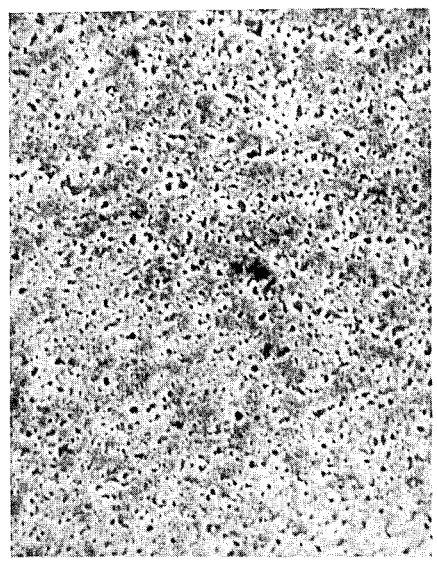
Figure 3:
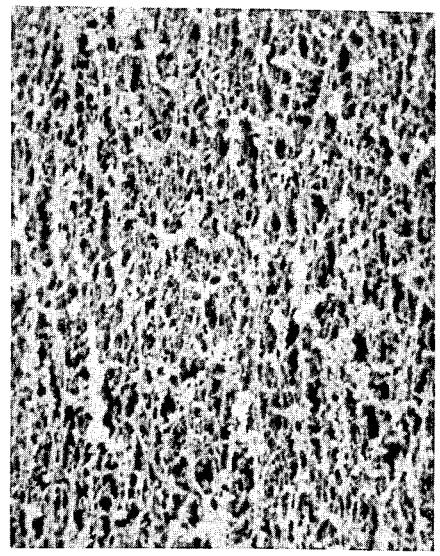

Composition of Blood:
Total protein content=12.2 g/dl, urea nitrogen content=14.0 mg/dl, uric acid content=5.9 mg/dl
Composition of Filtrate:
Total protein content=1.1 g/dl, urea nitrogen content=16.4 mg/dl, uric acid content=6.1 mg/dl From the foregoing results, it was confirmed that the porous regenerated cellulose hollow fiber obtained according to the process of the present invention can be used for separation of plasma or as an artificial kidney. Scanning type electron microscope photographs of the outer wall surface, intermediate part and inner wall surface of the hollow fiber obtained in this example are shown in FIGS. 1, 2 and 3, respectively, of the accompanying drawings.

COMPARATIVE EXAMPLE 1

The spinning solution used in Example 1 was directly extruded into air as a rate of 20 ml/min from an outer spinning orifice (5 mm in the outer diameter) while perchloroethylene was extruded into air at a rate of 5 ml/min from a central spinning orifice (1 mm in the outer diameter) of the annular spinneret, and the extrudate was let to freely fall down in air over the length of 300 mm and was thus stretched sufficiently so that the diameter of the extrudate was reduced to 600 μm. The linear extruded spinning solution was introduced into a coagulating bath filled with an aqueous solution of sodium hydroxide having a concentration of 11% by weight and the wound at a speed of 100 m/min. Incidentally, micro-phase-separation was not caused in the fibrous extrudate. The fibrous extrudate was sufficiently water-washed by showering and then washed with dilute sulfuric acid having a concentration of 3% by weight to effect regeneration of the filament. The filament was sufficiently washed with water again and then dried by passing the filament through a tunnel drier maintained at 130° C. The obtained hollow fiber had an outer diameter of 290 μm and an inner diameter of 240 μm. The physical properties and microstructural features of the obtained hollow fiber are shown in Table 1. In the same manner as described in Example 1, the permeation speed of the hollow fiber was measured to obtain results shown in Table 1. Average pore diameters of the outer wall surface, intermediate face an inner wall surface were very small, and pores could not be observed by a scanning type electron microscope. Accordingly, it was confirmed that the average pore diameter was smaller than 0.02 μm.

TABLE 1

|  | Example 1 | Comparative Example 1 |
|---|---|---|
| Average pore diameter (μm) on outer wall surface | 1.17 | * |
| Average pore diameter (μm) on inner wall surface | 1.24 | * |
| Average pore diameter (μm) on intermediate face | 0.46 | * |
| $D_1/D_2$ | 1.06 | * |
| $D_3/D_1$ | 0.39 | * |
| In-plane porosity (%) in outer wall surface portion | 36.4 | * |
| In-place porosity (%) in intermediate face portion | 10.6 | * |
| Average porosity (%) | 65 | 8 |
| Orientation parameter | −0.05 | 0.46 |
| Crystal form | Cell-II | Cell-II |
| Dynamic elastic modulus (dyn/cm$^2$) at 30° | $1.25 \times 10^{10}$ | $8 \times 10^{10}$ |
| Tmax (°C.) | 262 | 244 |
| Average molecular weight | $5.7 \times 10^4$ | $5.7 \times 10^4$ |
| Filtration speed (ml/min · cm$^2$ · mmHg) | $5.2 \times 10^{-3}$ | $3.1 \times 10^{-6}$ |

Note
*Evaluation was impossible because the pore diameter was too small.

EXAMPLES 2 THROUGH 6

Cellulose linter (having an average molecular weight of $2.35 \times 10^5$) was dissolved at a concentration shown in Table 2 in the same cuprammonium solution as used in Example 1, and the solution was filtered and bubbles were removed to form a spinning solution. the spinning solution was directly extruded at a rate of 1.25 ml/min from an outer annular spinning orifice (2 mm in the outer diameter) of an annular spinneret into a mixed solution (coagulant) in which the ratio of acetone to water was 101.1% by weight and the ratio of ammonia to water was 1.1% by weight, and a hollowing agent consisting of a mixed solution in which the ratio of acetone to water was 101.1% by weight and the ratio of ammonia to water was 1.1 % by weight was directly extruded from a central spinning orifice (0.4 mm in the outer diameter) of the annular spinneret at a rate of 1.77 ml/min into the coagulant. The extrudate was wound at a speed of 11 m/min. Then, the extrudate was regenerated with an aqueous solution of sulfuric acid having a concentration of 2% by weight and was then washed with water. Water in the obtained hollow fiber was replaced by acetone, and the hollow fiber was air-dried under tension. The physical properties and microstructural features of the hollow fiber were determined. The obtained results are shown in Table 2.

The transparent blue fibrous extrudate just after the extrusion was gradually whitened and micro-phase-separation was caused, and coagulation subsequently took place and the shape of a fiber was retained. The fibrous extrudate just after the extrusion, in which micro-phase-separation was caused, was substantially liquid. This was confirmed from the fact that the portion where micro-phase-separation was caused corresponded substantially to the portion to be attenuated when the winding speed was increased, and also from the fact that when a solid rod was caused to have direct contact with the portion where micro-phase-separation was caused, the extrudate adhered in the liquid state to the rod.

TABLE 2

|  | Example 2 | Example 3 | Example 4 | Example 5 | Example 6 |
|---|---|---|---|---|---|
| Cellulose concentration (% by weight) | 3.5 | 5.5 | 6.5 | 8.5 | 10.5 |
| Average molecular weight | $5.72 \times 10^4$ | $5.72 \times 10^4$ | $5.72 \times 10^4$ | $5.72 \times 10^4$ | $5.72 \times 10^4$ |
| Average pore diameter (μm) on outer wall surface | 2.56 | 2.21 | 0.98 | 0.30 | 0.09 |
| Average pore diameter | 2.70 | 2.50 | 1.08 | 0.41 | 0.11 |

TABLE 2-continued

|  | Example 2 | Example 3 | Example 4 | Example 5 | Example 6 |
|---|---|---|---|---|---|
| (μm) on inner wall surface |  |  |  |  |  |
| Average pore diameter (μm) on intermediate face | 2.07 | 1.61 | 0.34 | 0.09 | 0.02 |
| Porosity (%) | 76 | 73 | 72 | 61 | 53 |
| Crystal form | II | II | II | II | II |
| Orientation parameter | −0.18 | −0.12 | −0.01 | 0.20 | 0.38 |
| Dynamic elastic modulus (dyn/cm$^2$) at 30° C. | $0.95 \times 10^{10}$ | $1.10 \times 10^{10}$ | $1.22 \times 10^{10}$ | $1.75 \times 10^{10}$ | $3.10 \times 10^{10}$ |
| Tmax (°C.) | 260 | 259 | 261 | 261 | 263 |

EXAMPLE 7

The same spinning solution as used in Example 4 was directly extruded at a rate of 1.25 ml/min from an outer annular spinning orifice of an annular spinneret into a mixed solution in which the ratio of acetone to water was 101.1% by weight and the ratio of ammonia to water was 1.1% by weight, and a mixed solution in which the ratio of methyl ethyl ketone to water was 43.2% by weight and the ratio of ammonia to water was 0.8% by weight was directly extruded at a rate of 1.77 ml/min from a central spinning orifice of the annular spinneret. The extrudate was wound at a rate of 10 m/min. As in Examples 2 through 6, the transparent blue fibrous extrudate just after the extrusion was gradually whitened and microphase-separation was caused. Then, the extrudate was regenerated by an aqueous solution of sulfuric acid having a concentration of 2% by weight and washed with water. The physical properties and microstructural features of the obtained hollow fiber after drying were measured. It was found that the average molecular weight was $5.72 \times 10^4$, the average pore diameter on the outer wall surface was 0.85 μm, the average pore diameter on the inner wall surface was 0.91 μm, the average pore diameter in the intermediate part was 0.35 μm, the porosity was 63%, the crystal region consisted of a crystal of cellulose II, the orientation parameter of the plane (101) was 0.11, the dynamic elastic modulus at 30° C. was $1.25 \times 10^{10}$ dyn/cm$^2$, and Tmax was 265° C.

COMPARATIVE EXAMPLE 2

The same spinning solution as used in Example 4 was directly extruded at a rate of 1.25 ml/min from an outer annular spinning orifice of an annular spinneret into a mixed solution in which the ratio of acetone to water was 101.1% by weight and the ratio of ammonia to water was 1.1% by weight, and trichloroethylene (a liquid having no coagulating action to the spinning solution) was directly extruded at a rate of 1.77 ml/min from a central spinning orifice of the annular spinneret into the above mixed solution. The extrudate was wound at a rate of 5 m/min. Since the hollowing agent used had no coagulating action to the spinning solution and did not cause micro-phase-separation in the spinning solution, micro-phase-separation was not substantially caused and the transparent blue fibrous extrudate just after the extrusion was not substantially changed. The spinning state was very unstable and only a hollow fiber having slabs was obtained. The hollow fiber was regenerated by an aqueous solution of sulfuric acid having a concentration of 2% by weight and then washed with water. The physical properties and microstructural features were determined. The obtained results are shown in Table 3.

COMPARATIVE EXAMPLE 3

The same spinning solution as used in Example 4 was directly extruded at a rate of 1.25 ml/min from an outer annular spinning orifice of an annular spinneret into a mixed solution in which the ratio of acetone to water was 101.10% by weight and the ratio of ammonia to water was 1.1% by weight, and a mixed solution in which the ratio of methanol to water was 101.1% by weight and the ratio of ammonia to water was 1.1% by weight was directly extruded at a rate of 1.77 m/min from a central spinning orifice of the annular spinneret into the above mixed solution. The extrudate was wound at a rate of 11 m/min. The coagulant used was a liquid having a coagulating action to the spinning solution but it did not cause micro-phase-separation in the spinning solution. The extrudate was regenerated by an aqueous solution of sulfuric acid having a concentration of 2% by weight and then washed with water. The physical properties and microstructural features of the obtained hollow yarn were determined. The obtained results are shown in Table 3. The average pore diameter was very small and pores could not be observed by a scanning type electron microscope. Accordingly, it was confirmed that the average pore diameter was smaller than 0.02 μm.

TABLE 3

|  | Comparative Example 2 | Comparative Example 3 |
|---|---|---|
| Cellulose concentration (% by weight) | 6.5 | 6.5 |
| Average molecular weight | $5.72 \times 10^4$ | $5.72 \times 10^4$ |
| Average pore diameter (μm) on outer wall surface | 0.54 | * |
| Average pore diameter (μm) on inner wall surface | 0.08 | * |
| Average pore diameter (μm) on intermediate part | 0.11 | * |
| Porosity (%) | 38 | 15 |
| Crystal form | II | II |
| Orientation parameter | 0.31 | 0.41 |
| Dynamic elastic modulus (dyn/cm$^2$) at 30° C. | $2.9 \times 10^{10}$ | $5.3 \times 10^{10}$ |
| Tmax (°C.) | 259 | 248 |

Note
*Evaluation was impossible because the pore diameter was too small.

EXAMPLES 8 THROUGH 14

The same spinning solution as used in Example 4 was extruded at a rate of 1.25 ml/min from an outer annular spinning orifice of an annular spinneret into a mixed solution comprising water, acetone and ammonia at ratios shown in Table 4, and a mixed solution comprising water, acetone and ammonia at ratios shown in Table 4 was extruded at a rate of 1.77 m/min from a central spinning orifice of the annular spinneret into the above mixed solution. The extrudate was wound at a rate of 11 m/min. In each run, the transparent blue fibrous extrudate was gradually whitened and micro-phase-separation was caused. The extrudate was regenerated by an aqueous solution of sulfuric acid having a concentration of 2% by weight and then washed with water. The physical properties and microstructural features of the obtained hollow fiber after drying were determined. The obtained results are shown in Table 4.

having a composition causing micro-phase-separation in the cuprammonium solution of a cellulose.

4. A process for the preparation of a porous regenerated cellulose hollow fiber according to claim 1, wherein at least one organic solvent having a boiling point lower than 100° C., a solubility of at least 10% by weight in water and free of hydroxyl groups is added to the spinning solution at a concentration lower than the concentration corresponding to the gel point or at a concentration not higher than 30% by weight.

5. A process for the preparation of a porous regenerated cellulose hollow fiber according to claim 1, wherein the cellulose concentration in the spinning solution is in the range of from 4 to 10% by weight.

6. A process for the preparation of a porous regenerated cellulose hollow fiber according to claim 2,

TABLE 4

| | | Example 8 | Example 9 | Example 10 | Example 11 | Example 12 | Example 13 | Example 14 |
|---|---|---|---|---|---|---|---|---|
| Coagulant | Acetone/water (% by weight) | 25.2 | 43.2 | 67.3 | 101.1 | 152.1 | 67.3 | 67.3 |
| | Ammonia/water (% by weight) | 0.7 | 0.8 | 0.9 | 1.1 | 1.4 | 0.9 | 0.9 |
| Hollowing Agent | Aceton/water (% by weight) | 43.2 | 54.3 | 54.3 | 54.3 | 54.3 | 25.2 | 67.3 |
| | Ammonia/water (% by weight) | 0.8 | 0.9 | 0.9 | 0.9 | 0.9 | 0.7 | 0.9 |
| Average molecular weight | | $5.72 \times 10^4$ | $5.72 \times 10^4$ | $5.72 \times 10^4$ | $5.72 \times 10^4$ | $5.72 \times 10^4$ | $5.72 \times 10^4$ | $5.72 \times 10^4$ |
| Average pore diameter ($\mu$m) on outer wall surface | | 0.21 | 0.65 | 0.95 | 0.87 | 0.51 | 0.96 | 0.94 |
| Average pore diameter ($\mu$m) on inner wall surface | | 0.35 | 0.81 | 0.99 | 0.98 | 0.73 | 1.03 | 0.98 |
| Average pore diameter ($\mu$m) in intermediate part | | 0.04 | 0.20 | 0.39 | 0.35 | 0.19 | 0.43 | 0.45 |
| Porosity (%) | | 59 | 64 | 68 | 67 | 62 | 70 | 68 |
| Crystal form | | II | II | II | II | II | II | II |
| Orientation parameter | | 0.19 | 0.13 | −0.04 | 0.05 | 0.09 | −0.06 | −0.03 |
| Dynamic elastic modulus (dyn/cm$^2$) at 30° C. | | $1.8 \times 10^{10}$ | $1.33 \times 10^{10}$ | $1.23 \times 10^{10}$ | $1.26 \times 10^{10}$ | $1.35 \times 10^{10}$ | $1.20 \times 10^{10}$ | $1.21 \times 10^{10}$ |
| Tmax (°C.) | | 261 | 258 | 260 | 259 | 262 | 263 | 262 |

We claim:

1. A process for the preparation of a porous regenerated cellulose hollow fiber having a hollow portion extending continuously along the entire fiber length and a screen filter structure, comprising the steps of extruding a cuprammonium solution of a cellulose from an annular spinning orifice and coagulating, regenerating and water-washing the extrudate, said spinning solution being extruded from an outer annular spinning orifice and liquid that is composed of at least one organic solvent free of hydroxyl groups, having a solubility of at least 10% by weight in a 28% aqueous solution of ammonia, which does not swell a cellulose and having a composition causing micro-phase-separation in the cuprammonium solution of a cellulose, being extruded from a central spinning orifice, to cause micro-phase-separation to occur before the coagulation of said fiber.

2. A process for the preparation of a porous regeneration cellulose hollow fiber according to claim 1, wherein the liquid is extruded as a hollowing agent from the central spinning orifice, and the extrudate is fibrous.

3. A process for the preparation of a porous regenerated cellulose hollow fiber according to claim 2, wherein both the hollowing agent liquid extruded from the central spinning orifice and a coagulant having direct contact with the outer wall portion of the fibrous extrudate are mixed solutions comprising at least one organic solvent free of hydroxyl groups, having a solubility of at least 10% by weight in a 28% aqueous solution of ammonia, which does not swell a cellulose and wherein both the hollowing agent liquid extruded from the central spinning orifice and a coagulant having direct contact with the outer wall portion of the fibrous extrudate comprise an organic solvent, ammonia and water, the concentration of ammonia is not more than 5% by weight based on water, and the concentration of the organic solvent is in the range of from 20 to 160% by weight based on water.

7. A process for the preparation of a porous regenerated cellulose hollow fiber according to claim 6, wherein the organic solvent is acetone.

8. A process for the preparation of a porous regenerated cellulose hollow fiber according to claim 1, wherein the average molecular weight of the cellulose dissolved in the cuprammonium solution is at least $1 \times 10^5$.

9. A process for the preparation of a porous regenerated cellulose hollow fiber according to claim 3, wherein at least one organic solvent having a boiling point lower than 100° C., a solubility of at least 10% by weight in water and free of hydroxyl groups is added to the spinning solution at a concentration corresponding to the gel point or at a concentration not higher than 30% by weight.

10. A process for the preparation of a porous regenerated cellulose hollow fiber according to claim 9, wherein the cellulose concentration in the spinning solution is in the range of from 4 to 10% by weight.

11. A process for the preparation of a porous regenerated cellulose hollow fiber according to claim 3, wherein the cellulose concentration in the spinning solution is in the range of from 4 to 10% by weight.

12. A process for the preparation of a porous regenerated cellulose hollow fiber according to claim 3, wherein both the hollowing agent liquid extruded from the central spinning orifice and the coagulant having direct contact with the outer wall portion of the fibrous extrudate comprise an organic solvent, ammonia and water, the concentration of ammonia is not more than 5% by weight based on water, and the concentration of the organic solvent is in the range of from 20 to 160% by weight based on water.

13. A process for the preparation of a porous regenerated cellulose hollow fiber according to claim 3, wherein the average molecular weight of the cellulose dissolved in the cuprammonium solution is at least $1 \times 10^5$.

* * * * *